Oct. 10, 1933.  J. J. BROWN  1,930,452
ELECTRIC WELDING APPARATUS AND METHOD
Filed March 23, 1929  2 Sheets-Sheet 1
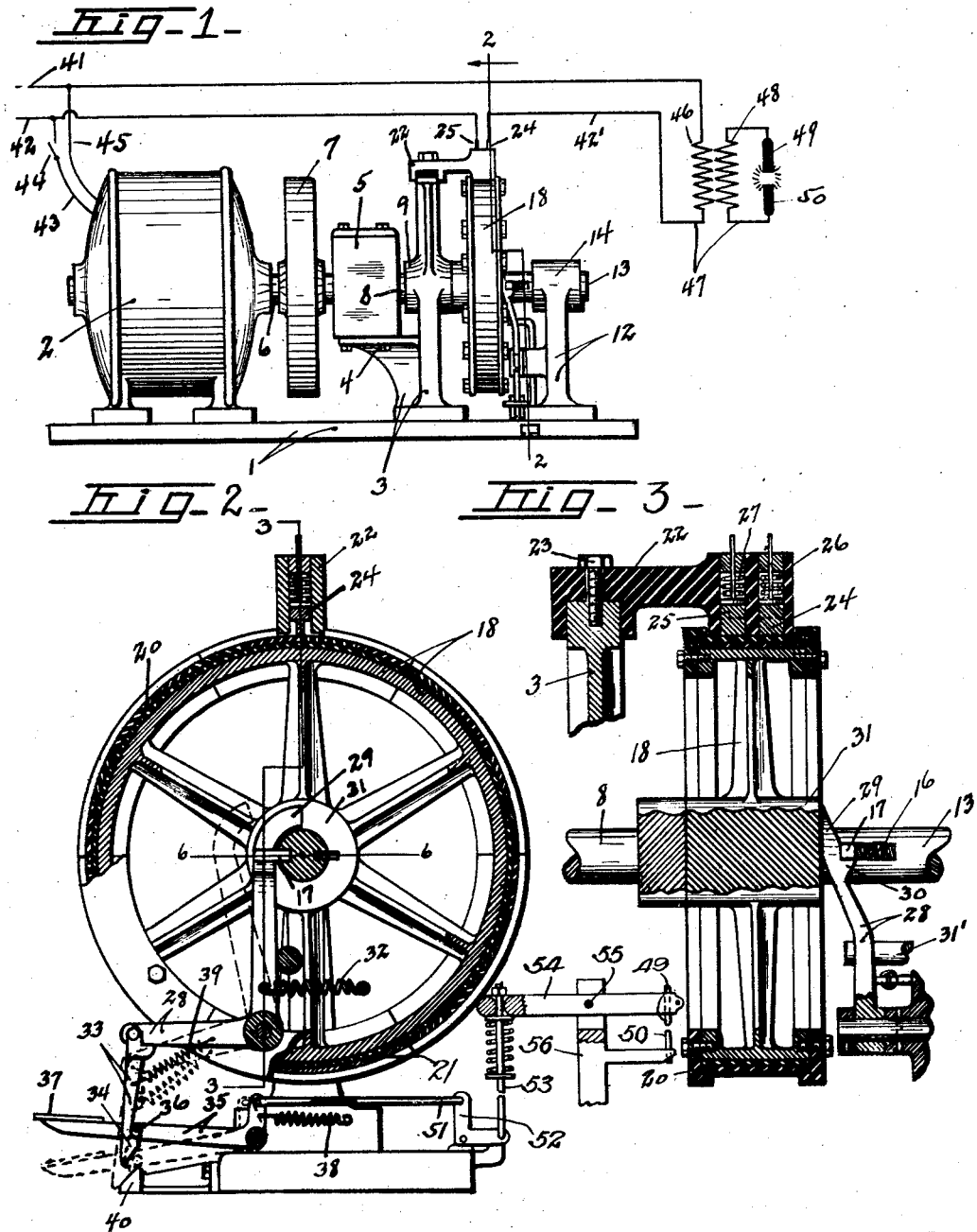
WITNESS
H. L. Meade.
INVENTOR.
Jesse J. Brown
BY
Denison Thompson
ATTORNEYS.

Oct. 10, 1933.   J. J. BROWN   1,930,452
ELECTRIC WELDING APPARATUS AND METHOD
Filed March 23, 1929   2 Sheets-Sheet 2

INVENTOR.
Jesse J. Brown
BY
Denison & Thompson
ATTORNEYS.

WITNESS.
H. L. Meade

Patented Oct. 10, 1933

1,930,452

UNITED STATES PATENT OFFICE 1,930,452

ELECTRIC WELDING APPARATUS AND METHOD

Jesse J. Brown, Syracuse, N. Y.

Application March 23, 1929. Serial No. 349,372

42 Claims. (Cl. 219—4)

This invention relates to a new and improved electric welding apparatus and method.

Although my invention may be used with any type of apparatus where it is desired to make and break electrical connections it is primarily designed for use with electric resistance welding or spot-welding machines.

When two pieces of metal are welded together by the use of a spot-welding machine, it is necessary that the current passing to the electrodes of the machine be of a predetermined duration, and in most instances, particularly where the material being welded is of a light gage, the duration of the current at the electrode is very short.

In order to obtain the best results in uniformly welding materials it is necessary that the electrodes be energized to the same extent and for the same period of time for each welding operation and to obtain this result it is necessary that the contact points used for making and breaking the electric circuit be always in the best condition, but inasmuch as it is difficult, if not impossible, to make and break such contacts with such rapidity as to prevent the making of an arc between the contacts when they are made and/or when they are broken, such arcing inevitably results in the devices hitherto known to the art. Where a welding machine is used on production work it is necessary that the electrical contact in the machine be made and broken several thousand times a working day, and when arcing takes place during the make and break operations the contact points become burnt and pitted, and will eventually tend to stick together.

When this happens the break will be delayed and it will be impossible to obtain uniform welds because the time periods of the contact will be prolonged and the electrodes will remain energized too long and this will frequently result in burning of the material and the resulting spoilage of the same. Furthermore when the contact points are burnt and pitted they will make poor contact with each other, and even if the electrodes are energized for the proper length of time, the work may not be heated to a sufficient degree to produce a normal weld i. e., the welds may not be uniform.

It will be evident that when the contacts of a welding machine are in poor condition there will be a very considerable loss of material which is spoiled or improperly welded, and a corresponding loss of the time of the operator.

Furthermore, even with good contacts, an arc, if it exists, will maintain the current flow to a substantial and objectionable extent and this is extremely detrimental where the welding current is to be applied for definite pre-determined short periods, as is necessary in some welding operations such as in certain kinds of spot welding. It is therefore important in such operations to avoid an arc at the conclusion of the intended period of welding to prevent interference with the desired accurate timing of the weld in order to produce uniform welds.

It will be seen from what has been said that it is also important to precisely control the time of application of the welding energy under different conditions.

One object of my invention is to produce a device by the use of which electrical contacts will be made in such a way that there can be no possibility of an arc forming between the contacts when the contact is made or broken.

Another object is to provide a device by the use of which the time of the weld, that is to say, the time during which the electrodes are energized, will be absolutely controlled.

A further object is to provide alternating current welding apparatus and methods by which the welding energy at the end of each weld may be terminated at the instant when the instantaneous energy is substantially zero.

Another object is to provide a device which will make and break the contact between the contacts in such a way that in every instance a good connection and a sharp disconnection will be made. The invention also contemplates the employment of the many features in combinations as well as individually.

Other objects and advantages including those relating to the size, shape and arrangement of parts will appear more fully from the following description taken in connection with the accompanying drawings in which:

Fig. 1 is a side elevation of my device connected to a welding machine shown diagrammatically.

Fig. 2 is a section on line 2—2, Fig. 1.

Fig. 3 is a section on line 3—3 of Fig. 2.

Figure 4:
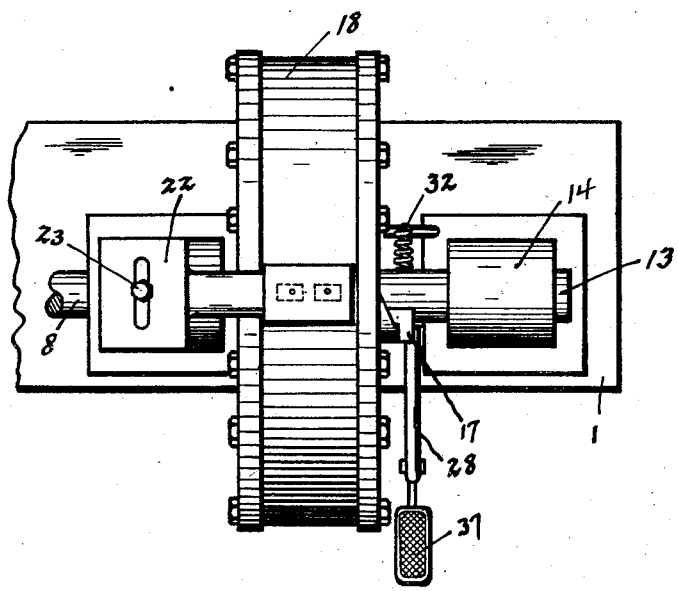
Fig. 4 is a top plan view of my device partially broken away.

My device consists of a base plate 1 upon which is secured at one end a synchronous motor 2 which, for the purpose of this description will be assumed to have a speed of 3,600 R. P. M. On base plate 1 in spaced relation to motor 2, I provide an upwardly extending frame 3, having at one side an outwardly extending integral shelf 4. On shelf 4 is secured a speed reducing unit 5. The armature shaft 6 of motor 2 extends into the speed reducing unit 5, and is operatively connected thereto. Between motor 2 and speed reducing unit 5, I secure on armature shaft 6, a fly-wheel 7. The construction of the speed reducing unit 5 is such that the speed of the armature shaft 6, causes the shaft 8 of the speed reducing unit 5 to revolve at a rate of 1/50th of the speed of the armature shaft 6. The shaft 8 is journaled in a bearing 9 in frame 3.

Figure 6:
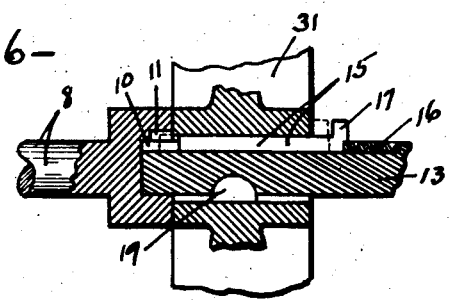
Fig. 6 is a section on line 6—6 of Fig. 2.

As perhaps may best be seen from Fig. 6 the outer end of shaft 8 is provided with a circular aperture 10 and a slot 11 in communication therewith.

On the end of base plate 1, I provide an upwardly extending support 12. A shaft 13 has one end journaled in a bearing 14 on the upper end of support 12, and has its opposite end journaled in the aperture 10 in shaft 8. The end of shaft 13 adjacent shaft 8 is provided with a slot of the same cross-sectional area as slot 11. A pin 15 is slidably mounted in the slot in shaft 13, and is spring pressed as at 16, toward slot 11. The pin 15 has on the end adjacent spring 16 an outwardly extending finger 17 for a purpose hereafter to be described.

A movable switching element or contact wheel 18 is secured as by a key 19 on the end of shaft 13 abutting against the end of shaft 8. Contact wheel 18 has the major portion of its periphery covered by an insulating material 20. On one portion of the periphery of contact wheel 18, I provide a contact member or segment 21 of high electric conductivity and of a predetermined length, depending upon the use to which my device is to be put.

On the top of frame 3, is adjustably secured a brush holder 22, by means of a bolt 23. A pair of contact brushes 24 and 25 is slidably mounted in the end of brush holder 22, brush 24 being spring pressed by means of spring 26 against contact wheel 18, and brush 25 being spring pressed against contact wheel 18 by a spring 27.

The brush holder 22 is made of insulating material so that brushes 24 and 25 are insulated one from the other and from frame 3.

A bell-crank 28 is pivotally mounted on support 12 and carries on its upper end a wedge or cam shaped portion 29 and a shoulder 30. The wedge shaped end 29 of bell-crank 28 is in sliding contact with the hub 31 of contact wheel 18. A spring 32 has one end secured to support 12 and the other end secured to the arm of bell-crank 28 which carries the wedge shaped portion 29 and releasably holds the wedge shaped end 29 in contact with a stop 31' on support 12. On the other end of bell-crank 28, I provide a pivotally mounted link 33, having a notched end 34. A second bell-crank 35 is pivotally mounted on support 12, and has on one arm a pin 36 normally seated in the notched end 34 of link 33.

For convenience of operation, I provide on the end of bell-crank 35, which carries pin 36, an actuating member in the form of a pedal 37. Spring 38 has one end connected to the other arm of bell-crank 35, and has its other end secured to support 12, to normally hold the first named arm of bell-crank 35 in the raised position. Another spring 39, has one end secured to the arm of bell-crank 28 on which link 33 is pivotally moutned, and has its other end secured to link 33 to normally hold link 33 towards and in registration with pin 36. Beneath the notched end 34 of link 33, I provide a wedge shaped block 40.

The relation of parts is such, that when the arm of bell-crank 35, carrying pin 36 is moved downwardlly into the position shown in dotted lines on Fig. 2, the notched end 34 of link 33 will come into contact with the beveled face of block 40, and will be forced outwardly so that it will be moved out of contact with pin 36, which will permit bell-crank 28 to return to the normal position shown in heavy lines on Fig. 2. When the pedal is then released, spring 38 will cause the outer arm of bell-crank 35 to move upwardly and pin 36 will then again become seated in the notched end 34 of link 33.

With the parts in the position indicated in Fig. 3 and in heavy lines in Fig. 2, the finger 17 of pin 15 will be in contact with the wedge shaped end 29 of bell-crank 28 and will be seated on shoulder 30, in which position it will be retracted from the slot 11 in shaft 8, and the shaft 8 will then rotate without communicating motion to shaft 13 and contact wheel 18. When the bell-crank 35 is moved about its pivot it will, through link 33, cause bell-crank 28 to be moved about its pivot. Such movement will cause the wedge shaped end 29 of bell-crank 28 to be moved out of contact with stop 31' and finger 17 on pin 15. When pin 15 is so released it will be pressed forward by spring 16 and will become seated in slot 11, when the latter comes into registration with pin 15, during the revolution of shaft 8. When pin 15 is in registration with slot 11, shaft 8 will be locked to shaft 13, to cause the revolution of contact wheel 18 which is secured to shaft 13.

As the outer arm of bell-crank 35 moves downwardly, the notched end 34, coming into contact with block 40, will be released from pin 36 and spring 32 will then cause bell-crank 28 to move about its pivot and wedge shaped end 29 of bell-crank 28 will move inwardly into contact with stop 31'. With the parts in this position the finger 17 on pin 15 will contact with the end of the wedge shaped end 29 and will move outwardly on the beveled face thereof and into contact with shoulder 30, which will result in the withdrawal of pin 15 from slot 11, and the stopping of the rotation of shaft 13 and contact wheel 18.

It will thus be seen that the apparatus described is so constructed that an actuation of pedal 37 serves to initiate or start a welding operation, and the pre-determined duration of the welding energy is thence automatically timed wholly independent of the control of the operator of the machine after he has initiated the welding operation by depressing the pedal. Even if the actuation of the initiating means is prolonged, as by the operator moving the pedal slowly or keeping his foot on it, this will not affect the duration of the welding period or produce a repetition thereof, because the one revolution-and-stop clutch, the initiating means including the parts 34 and 36, and the block 40 associated therewith, are arranged to prevent more than one timed welding period for each actuation of the initiating means. Other means may be used to accomplish this control.

Operation

For the purpose of explaining the operations of my device I have shown in Fig. 1 leads 41 and 42, leading to a source of alternating current potential, not shown. Lead 42 is connected to motor 2 through a lead 43 and a main switch 44. Lead 41 is connected to motor 2 through a lead 45. Lead 42 is also connected to brush 25. Lead 41 is connected to one side of the primary 46 of a transformer 47, the secondary 48 of the transformer being connected to the electrodes 49 and 50 to constitute an electric resistance welder or a spot welder. Brush 24 is connected to the primary 46 by lead 42'.

When it is desired to use my device the main switch 44, is closed thereby connecting the motor 2 to the source of potential which will cause the rotary movement of the armature shaft 6, to be transmitted through the speed reducing unit 5 to the shaft 8.

The electrodes 49 and 50, having been properly positioned with reference to the material to be welded, the operator depresses the outwardly extending arm of bell-crank 35, which through link 33 will cause bell-crank 28 to be moved about its pivot, and such movement will withdraw the cam shaped end 29 of bell-crank 28 from registration with finger 17 on pin 15 to permit pin 15 to move inwardly into registration with slot 11 in shaft 8 to lock shaft 8 to shaft 13. When this has been accomplished the rotary motion of shaft 8 will be communicated to shaft 13 and contact wheel 18, and such movement of contact wheel 18 will cause contact segment 21 to be moved upwardly into contact with brushes 24 and 25, to make an electric connection between them and so complete a circuit from the source of potential to the primary 46 of the transformer 47. So long as this circuit remains completed the electrodes 49 and 50 will remain energized to effect the welding operation. As soon as the contact segment 21, due to the continued rotation of contact wheel 18, has passed out of contact with brushes 24 and 25, the electric connection between such brushes will be broken which will result in the breaking of the circuit from the source of potential to the primary 46 of the transformer 47 and the electrodes 49 and 50 will be de-energized.

The depression by the operator of the outwardly extending arm of bell-crank 35 will result in the movement of link 33 away from pin 36, and the wedge shaped end 29 of bell-crank 28 will return to the normal position as heretofore described into a position to engage the finger 17 on pin 15 as shaft 13 continues its rotation, and this engagement of wedge shaped end 29 with finger 17 will break the driving connection between shaft 8 and shaft 13, and shaft 13 and contact wheel 18 will be stopped ready for the next operation.

Figure 5:
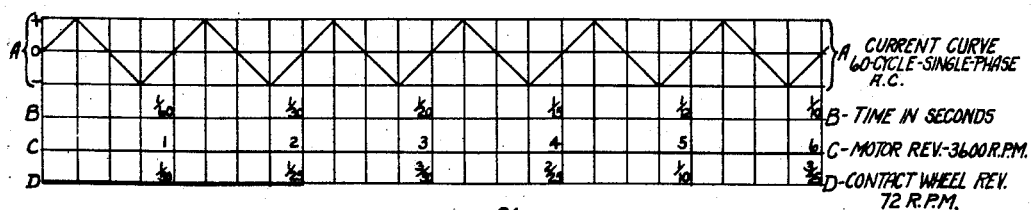
Fig. 5 is a chart illustrating the operation of my device.

In Fig. 5, I have shown a chart of the operation of my device in which the portion A—A shows the current curve of the 60-cycle single phase 3600 R. P. M. synchronous motor 2; B—B shows the time consumed in seconds; C—C motor revolutions and D—D contact wheel revolutions. The revolutions of the motor, 3600 R. P. M., having been transmitted to the contact wheel through a reducing means of 50 to 1, the number of R. P. M. of the contact wheel is 72. It will be noted from the chart that a single cycle, starting at zero and ending at zero, will have been completed in 1/60th of a second, during which time the motor will have made one revolution and the contact wheel will have made 1/50th of a revolution.

In order that the circuit between brushes 24 and 25 may be made and broken without any possibility of an arc being formed between them or either of them and the contact segment 21, I so arrange the different parts of my device that the engagement of pin 15 in slot 11, to cause the rotation of contact wheel 18 with shaft 8 will cause the forward part of contact segment 21 to contact with the brushes 24 and 25 at the time when the instantaneous value of the current is zero, so that at the instant of contact practically no current will be present to form an arc. I also so construct the segment 21 with reference to the width of the brushes 24 and 25 that such brushes will break contacts with contact segment 21 at the instant the instantaneous value of the current is approximately zero, so that there will be practically no current present to cause an arc when such contact is broken.

With the circuit open there will of course be no welding current present until the brushes 24 and 25 contact with the segment 21 and the functioning of my device may be explained in another way—by saying that the brushes may be set to contact with the segment at a time when the current will resume its normal curve starting from a point where its instantaneous value is approximately zero.

It will be seen that the supply of welding energy is timed by the relative movement between the contact member and brushes, and that by changing the length of contact segment 21 with reference to brushes 24 and 25 the duration of the contact between such brushes and such segment can be varied to any multiple of 1/60th of a second, and still make and break the contact between the segment and the brushes when the instantaneous value of the current is approximately zero. It is also apparent, that segment 21 may be made of such length as to close the circuit at any desired point in the current wave, but still break it at substantially the zero point, thus utilizing a fraction of a cycle or half cycle.

It will be understood, that my object is to provide a device in which the contact completing the circuit to the electrodes of a spot welding machine will be made and/or broken at the instant when the instantaneous value of the current in the circuit is approximately zero, and although I have described a motor having a particular number of revolutions per minute and a contact wheel having a particular number of revolutions per minute, the speed so indicated may be varied if desired, providing only that the relation of parts is such that the contact segment on the contact wheel will make and/or break contact with the brushes in the circuit, at the instant when the instantaneous value of the current in the circuit is approximately zero.

An arrangement such as described in which relative movement of circuit controlling elements is caused by a synchronous motor, and in which the parts are so disposed as to open and/or close a circuit at definite points of the periodic current cycle, will be herein referred to as a synchronous switch.

Movement of the electrode 49 relative to electrode 50 synchronously with the operation of the switch is automatically effected upon operation of the bell crank 35 through the medium of the link connection 51 with the bell crank 52 that in turn has a tensioned rod connection 53 with the lever 54 carrying the electrode 49, the lever 54 being pivotally mounted as at 55 on the bracket 56.

It will also be understood that the duration of the time of a weld may be varied according to the material which is to be subjected to the welding operation, and for this purpose, I prefer to have removable contact segments of different lengths, so that the same may be changed from time to time as the character of the work upon which the welding operation is to be performed varies. I also prefer, as here shown, to provide adjustable brush holder 22, which will permit the brushes to be moved around the periphery of the contact wheel, as this is an aid in obtaining the initial proper adjustment of my device.

It will also be understood that the size, shape and exact relation of the different parts of my device may be varied to a considerable extent, without departing from the spirit of my invention, for although I have shown and described a specific structure as illustrative of an embodiment of my invention, I do not desire to restrict myself to the exact size, shape or relation of parts, as various changes may be made within the scope of the appended claims.

I claim:

1. The combination with electric resistance welding apparatus, of a normally open alternating current circuit connected to the apparatus, circuit closing means including a brush and contact segment, and means for bringing the brush and contact segment into engagement at a time when the current will resume its normal curve starting from a point where its instantaneous value is approximately zero, said means including a synchronous motor associated with said alternating current circuit, a revoluble wheel supporting the contact segment and a clutch for connecting the motor to the wheel, whereby rotary motion will be imparted to the latter, the clutch device including a cam member and a key movable in a circular path automatically operated by the cam member.

2. The combination with electric resistance welding apparatus, of a normally open alternating current circuit connected to the apparatus, circuit closing means including a brush and contact segment, a revoluble wheel carrying said contact segment on its periphery and having the remaining portion of its periphery non-conducting, and means for revolving the wheel to bring the contact segment into contact with the brushes at a time when the current will resume its normal curve starting from a point where its instantaneous value is approximately zero, said means including a synchronous motor associated with said alternating current circuit and a clutch for connecting the wheel to the motor, including a tensioned sliding key carried by the wheel and normally out of engagement with the motor and a manually releasable wedge member controlling movement of the key.

3. The combination with electric resistance welding apparatus, of a source of potential, a normally open circuit for connecting the source of potential to the apparatus, an adjustable contact brush on each of the open ends of the circuit, a revoluble wheel having the major portion of its periphery covered by an insulating material, a contact segment adapted to complete an electrical connection between said brushes when in contact therewith, secured to the periphery of the wheel between the ends of said insulating material, and means for revolving the wheel to bring the contact segment into contact with the brushes at a time when the current will resume its normal curve starting from a point where its instantaneous value is aproximately zero, said means including a synchronous motor in circuit with the source of potential, a speed reducing unit operatively connected to the armature shaft of the motor and a clutch for connecting the wheel to the speed reducing unit.

4. The combination with an electric-resistance-welding device, of a source of alternating current potential, a normally open circuit from said source of potential to said device, and a synchronous switch for closing the circuit at a time to produce normal current wave form having an initial instantaneous value of zero and including means for opening said circuit when the instantaneous value of the current is zero.

5. The combination with an electric-resistance-welding device, of a source of alternating current potential, a normally open circuit from said source of potential to said device, a synchronous switch for closing the circuit at a time to produce normal current wave form having an initial instantaneous value of zero, including means for maintaining said circuit closed for a predetermined length of time, and means for opening said circuit when the instantaneous value of current is zero.

6. The combination with an electric resistance welding device, of a normally open alternating current circuit connected to said device, and a synchronous switch comprising synchronously driven relatively movable contact members adapted to cooperate to close said circuit, and including means to bring said members into engagement at a time to produce normal current wave form in said circuit having an initial instantaneous value of zero.

7. The combination with an electric resistance welding device, of a normally open alternating current circuit connected to said device, and a synchronous switch comprising synchronously driven relatively movable contact members adapted to cooperate to close said circuit and including means to bring said members into engagement at a time to produce normal current wave form in said circuit having an initial instantaneous value of zero, one of said contact members having a predetermined length to maintain said engagement a predetermined length of time.

8. The combination with an electric resistance welding device, of a normally open alternating current circuit connected to said device, and a synchronous switch comprising a synchronously driven contact member and a stationary contact member adapted to cooperate therewith to close said circuit, and including means to bring said members into engagement at a time to produce normal current wave form in said circuit having an initial instantaneous value of zero, said contact members being adapted to break contact and being constructed to disengage at a time when the instantaneous value of current in the circuit is zero.

9. Electric resistance welding apparatus comprising a pair of electrodes adapted to be brought into contact with the work, a source of alternating current potential, a normally open circuit adapted to connect the source of potential to the electrodes, a terminal member on each of the open ends of the circuit, means for electrically connecting said terminal members to close the electrode circuit at a time when the current will resume its normal curve starting from a point where its instantaneous value is approximately zero, and associated means for bringing the electrodes into contact with the work at a time before the closing of the electrode circuit.

10. Electric resistance welding apparatus comprising a pair of electrodes adapted to be brought into contact with spaced portions of the work, a source of alternating current potential, a normally open circuit adapted to connect the source of potential to the electrodes, a terminal member on each of the open ends of the circuit, means for electrically connecting said terminal members to close the electrode circuit at a time when the current will resume its normal curve starting from a point where its instantaneous value is approximately zero and to maintain said circuit closed a predetermined length of time, and for opening said circuit at a time when the instantaneous value of current is substantially zero, and associated means for bringing the electrodes into contact with the work at a time before the closing of the electrode circuit, and for withdrawing the electrodes from the work after said circuit has been opened.

11. An electric resistance welding machine comprising a plurality of electrodes adapted to be placed in contact with articles to be welded, means for energizing said electrodes with a source of alternating current potential including a normally open circuit, a synchronous switch electrically operated from said source of potential for closing said circuit at a time to produce normal current wave form having an initial instantaneous value of zero in said circuit, and means for simultaneously controlling said switch to set it initially into operation and for placing said electrodes in contact with the articles to be welded.

12. An electric resistance welding machine comprising a plurality of electrodes adapted to be placed in contact with articles to be welded, means for energizing said electrodes with a source of alternating current potential including a normally open circuit, a synchronous switch electrically operated from said source of potential for closing said circuit at a time to produce normal current wave form having an initial instantaneous value of zero in said circuit, for maintaining said circuit closed a predetermined length of time and for opening said circuit when the instantaneous value of current is zero, and manually operated means for simultaneously controlling said switch to set it initially into operation and for placing said electrodes in contact with the articles to be welded.

13. An electric resistance welding machine comprising a plurality of electrodes adapted to be placed in contact with articles to be welded, means for energizing said electrodes with a source of alternating current potential including a normally open circuit, a synchronous switch comprising a synchronously driven contact wheel, a pair of brushes electrically associated with said circuit in contact with said wheel, a contact segment on said wheel for closing said circuit through said brushes while the same are in contact with said segment, said brushes being positioned so that contact occurs at a time to produce normal current wave form in the circuit having an initial instantaneous value of zero, a clutch member for engaging said contact wheel with its driving means and means for initially actuating said clutch member and for placing said electrodes in contact with the articles to be welded before the closing of the switch.

14. An electric resistance welding machine comprising a plurality of electrodes adapted to be placed in contact with articles to be welded, means for energizing said electrodes with a source of alternating current potential including a normally open circuit, a synchronous switch comprising a synchronously driven contact wheel, a pair of brushes electrically associated with said circuit in contact with said wheel, a contact segment on said wheel for closing said circuit through said brushes while the same are in contact with said segment, said brushes being positioned so that contact occurs at a time to produce normal current wave form in the circuit having an initial instantaneous value of zero, and for opening said circuit when the instantaneous value of current is zero, a clutch member for engaging said contact wheel with its driving means and means for initially actuating said clutch member and for placing said electrodes in contact with the articles to be welded before the closing of the switch.

15. An electric risistance welding machine comprising a plurality of electrodes adapted to be placed in contact with articles to be welded, means for energizing said electrodes with a source of alternating current potential including a normally open circuit, a synchronous switch comprising a synchronously driven contact wheel, a pair of brushes electrically associated with said circuit in contact with said wheel, a contact segment on said wheel for closing said circuit through said brushes while the same are in contact with said segment, said brushes being positioned so that contact occurs at a time to produce normal current wave form in the circuit having an initial instantaneous value of zero, a clutch member for engaging said contact wheel with its driving means and manually operated means for initially actuating said clutch member and for placing said electrons in contact with the articles to be welded before the closing of the switch, and automatic means for disengaging said clutch member after said contact wheel has completed one revolution.

16. The combination with electric resistance welding apparatus, of a source of potential, a normally open circuit for connecting the source of potential to the apparatus, a contact member on each of the open ends of the circuit, a contact segment adapted to complete an electrical connection between said contact member when in contact therewith, and coupling elements normally separated and manually and automatically releasable for engagement for placing the contact segment in contact with the contact members at a time when the current will resume its normal curve starting from a point where its instantaneous value is approximately zero and for breaking contact between said segment and said contact members at a time when the instantaneous value of current is substantially zero.

17. The combination with electric resistance welding apparatus, of a source of potential, a normally open circuit for connecting the source of potential to the apparatus, a contact member on each of the open ends of the circuit and coupling elements normally separated and manually and automatically releasable for engagement for closing the circuit through said contact members at a time when the current will resume its normal curve starting from a point where its instantaneous value is approximately zero and for breaking contact between said contact members at a time when the instantaneous value of current is substantially zero.

18. The combination with an electric resistance welding device, of a normally open alternating current circuit operatively connecting a source of potential with said device, a synchronous motor connected with said circuit, and a switch operated by said motor for closing said circuit, said switch comprising means for maintaining said circuit closed for a predetermined length of time and means for opening said circuit at a moment when the instantaneous value of the current is substantially zero, and a one revolution-and-stop clutch between said motor and switch for actuating the latter.

19. The combination with an electric resistance-welding device, of a source of alternating current potential, a normally open circuit from said source of potential to said device, a synchronous switch for closing said circuit at a time to produce normal current wave form having an initial instantaneous value of zero including means for maintaining said circuit closed for a predetermined length of time, and means for opening said circuit when the instantaneous value of current is substantially zero, said last named means including releasable coupling elements for actuating said synchronous switch.

20. The combination with an electric resistance welding device, of a source of alternating current potential, a normally open circuit from said source of potential to said device, a synchronous switch for effecting the closure of said circuit, said switch comprising means for maintaining said circuit closed for a predetermined length of time, and for opening said circuit when the instantaneous value of current is substantially zero.

21. Electric resistance welding apparatus comprising a pair of electrodes adapted to be brought into contact with work, a source of alternating current potential, an electric circuit connecting the source of potential to said apparatus, means for energizing the circuit and for maintaining said circuit energized for a predetermined length of time and for de-energizing said circuit at a time when the instantaneous value of current becomes substantially zero.

22. Electric resistance welding apparatus comprising a pair of electrodes adapted to be brought into contact with work, a source of alternating current potential, an electric circuit connecting the source of potential to the electrodes, means of supplying welding energy to said circuit for a predetermined number of cycles or fraction thereof of the alternating current and means for cutting off said welding energy at a time when the instantaneous value of current becomes approximately zero.

23. The method of electric resistance welding consisting of holding in contact the parts to be welded, applying to said parts welding energy in the form of alternating current for a period of a predetermined length of time for each weld, and timing the start of said period in relation to the phase of said alternating current so that said period will terminate at a time when the instantaneous value of said current becomes substantially zero.

24. The method of electric resistance welding consisting of holding in contact the parts to be welded, applying to said parts welding energy in the form of alternating current and terminating said application of welding energy at a zero phase of the current cycle.

25. A method of electric resistance welding using a circuit of alternating current supplying welding electrodes, said method comprising the energization of said circuit to welding strength, and de-energization of said circuit to below welding strength substantially at a zero phase of the current cycle.

26. The method of electric resistance welding consisting of holding in contact the parts to be welded, passing an alternating welding current through said parts, allowing said welding current to flow for a predetermined length of time and interrupting said welding current when the same has reached a zero phase of the current cycle.

27. The method of electric resistance welding consisting of passing an alternating welding current of normal wave form through electrodes and having an initial instantaneous value of approximately zero, and interrupting said welding current when the same has reached an instantaneous value of approximately zero due to normal phase action.

28. The method of electric resistance welding comprising holding in contact the parts to be welded, passing an alternating welding current through said parts, continuing the flow of welding current for a predetermined definite number of half-cycles, and stopping said welding current substantially at the zero point of a cycle.

29. The combination with an electric resistance welding device, of a normally open alternating current circuit for energizing said device, relatively movable switching elements for controlling said circuit, a synchronous motor for causing relative movement of said elements, and means whereby said elements are rendered effective to close said circuit and maintain it closed during a definite time period, said switching elements being so adjusted with relation to the phase of the current and to each other that they serve to open said circuit at the moment when the instantaneous value of the current therein is substantially zero.

30. The combination with an electric resistance welding device, of a normally open alternating current circuit for energizing said device, means for controlling said circuit, comprising a rotary element and a co-operating element, a synchronous motor for driving said rotary element, and means whereby said elements are rendered effective to close said circuits and maintain it closed during a predetermined portion of a revolution of said rotary element and then open said circuit, the said circuit controlling elements being so adjusted with relation to the phase of the current and to each other that they serve to open said circuit at the moment when the instantaneous value of the current therein is substantially zero.

31. The combination with an electric resistance welding device, of a normally open alternating current circuit for energizing said device, relatively fixed and rotary switching elements for controlling said circuit, a synchronous motor for driving the rotary switching element, and means initiated by the operator for rendering said elements effective to close said circuit, said elements thereafter operating independently of said initiating means to automatically maintain said circuit closed for a definite period of time and then open said circuit, and said elements being so adjusted with relation to the phase of the current and to each other that they serve to open said circuit at the moment when the instantaneous value of the current therein is substantially zero.

32. A method of electric resistance welding comprising holding in contact the parts to be welded, passing through said parts for a definite time interval a periodic welding current fluctuating to and from zero and terminating said welding current at substantially the zero phase of a cycle.

33. A method of electric resistance welding using an electric circuit in which the energy fluctuates to and from zero and welding electrodes, said method comprising the energization of said circuit to welding strength, and the de-energization of said circuit to below welding strength at a time when the instantaneous energy is substantially zero.

34. Electric resistance welding apparatus comprising a pair of electrodes arranged to be brought into contact with work, an electric circuit for supplying the electrodes with energy, and means for operatively energizing said circuit with current fluctuating to and from zero and for maintaining said circuit energized for a definite length of time, and for effectively de-energizing said circuit at a time when the instantaneous energy value is substantially zero.

35. Electric resistance welding apparatus comprising a pair of electrodes arranged to be brought into contact with work, an alternating current electric circuit for supplying the electrodes with energy, means for operatively energizing said circuit and for maintaining said circuit energized for a predetermined length of time, and for effectively de-energizing said circuit at a time when the instantaneous energy value is substantially zero, means for initiating the operation of said means, and means whereby only one effective energization of said circuit can result from one actuation of said initiating means, regardless of how long said actuation may continue.

36. Electric resistance welding apparatus comprising a pair of electrodes arranged to be brought into contact with work, an electric circuit for supplying the electrodes with energy, means for operatively energizing said circuit with current fluctuating to and from zero and for maintaining said circuit energized for a definite length of time, and for effectively de-energizing said circuit at a time when the instantaneous energy value is substantially zero, means for initiating the operation of said means, and means for preventing more than a single energization of said circuit to welding strength for each actuation of said initiating means.

37. Electric spot welding apparatus comprising a pair of electrodes arranged to be brought into contact with work, an electric circuit for supplying the electrodes with energy periodically fluctuating to and from zero, means for initiating the flow of welding energy over said circuit, and means for definitely limiting the amount of such energy to that required for a single weld and for terminating the flow of welding energy at a time when its instantaneous value is substantially zero.

38. An electric spot welding apparatus including a pair of electrodes arranged to be brought into contact with work, an electric circuit for supplying the electrodes with energy periodically fluctuating to and from zero, means for operatively energizing said circuit and for automatically maintaining said circuit energized for a definite period of time and said means then effectively de-energizing said circuit when the instantaneous energy value is substantially zero, means for initiating the operation of said means, and means for preventing more than a single such effective energization of said circuit to welding strength for each actuation of said initiating means.

39. An electric spot welding apparatus including a pair of electrodes arranged to be brought into contact with work, a source of alternating current electrical energy, an electric circuit for supplying energy from said source to the electrodes, time controlled means for successively operatively energizing said circuit, automatically maintaining said circuit energized for a definite length of time, and said means then effectively de-energizing said circuit when the instantaneous energy value is substantially zero, means for initiating the cycle of operation of said means, and means for preventing more than a single effective energization of said circuit for each actuation of said initiating means, said time controlled means operating on a power generated independently of said initiating means.

40. An electric spot welding apparatus including a pair of electrodes arranged to be brought into contact with work, an electric circuit for supplying welding energy to the electrodes, means for operatively energizing said circuit and for automatically maintaining said circuit energized for a predetermined period of time, and said means then effectively de-energizing said circuit when the instantaneous energy value is substantially zero, means for initiating the cycle of operation of said means, and means whereby the said cycle of operation is carried out by power generated independently of said initiating means and wholly independent of the duration of the actuation thereof, and also independent of said electrodes, and whereby a single such actuation can produce but one such cycle of operation.

41. Electric resistance welding apparatus comprising a pair of electrodes arranged to be brought into contact with work, an electric circuit for supplying the electrodes with energy, and means for operatively energizing said circuit with current fluctuating to and from zero and for maintaining said circuit energized for a definite length of time, and for effectively de-energizing said circuit at a moment when the instantaneous energy value is substantially zero, said means including a continuously operating timing device, together with means adjustable to alter the phase relation of effective operation existing between said timing device and the elements whose operations are timed by it.

42. Electric resistance welding apparatus comprising a pair of electrodes arranged to be brought into contact with work, an electric circuit for supplying the electrodes with energy, and means for operatively energizing said circuit with current fluctuating to and from zero and for maintaining said circuit energized for a definite length of time, and for effectively de-energizing said circuit at a moment when the instantaneous energy value is substantially zero, said means including a continuously operating timing device, together with means adjustable during the said continuous operation to alter the phase relation of effective operation existing between said timing device and the elements whose operations are timed by it.

JESSE J. BROWN.

CERTIFICATE OF CORRECTION.

Patent No. 1,930,452.                                                October 10, 1933.

JESSE J. BROWN.

It is hereby certified that error appears in the printed specification of the above numbered patent requiring correction as follows: Page 5, line 107, claim 15, for "electrons" read electrodes; and that the said Letters Patent should be read with this correction therein that the same may conform to the record of the case in the Patent Office.

Signed and sealed this 21st day of January, A. D. 1936.

Leslie Frazer
(Seal)                                                     Acting Commissioner of Patents.